(12) United States Patent
Chubb, Jr. et al.

(10) Patent No.: US 7,038,620 B1
(45) Date of Patent: May 2, 2006

(54) WARPED PLANE PHASED ARRAY MONOPULSE RADAR ANTENNA

(75) Inventors: Charles F. Chubb, Jr., Brookville, NY (US); Seymour Sutkin, Huntington Station, NY (US)

(73) Assignee: Northrop Grumman Corporation, Los Angeles, CA (US)

( * ) Notice: Subject to any disclaimer, the term of this patent is extended or adjusted under 35 U.S.C. 154(b) by 1826 days.

(21) Appl. No.: 07/012,598

(22) Filed: Jan. 27, 1987

Related U.S. Application Data (63) Continuation of application No. 06/576,849, filed on Feb. 3, 1984, now abandoned.

(51) Int. Cl.
*H01Q 3/22* (2006.01)
*H01Q 3/26* (2006.01)
*G01S 13/00* (2006.01)

(52) U.S. Cl. .................. 342/368; 342/153; 342/371; 342/372; 343/754

(58) Field of Classification Search ............ 343/16 M, 343/368, 371, 372, 754, 770, 771; 342/153, 342/368, 371, 372
See application file for complete search history.

(56) References Cited

U.S. PATENT DOCUMENTS

| | | | | |
|---|---|---|---|---|
| 3,623,094 A | * | 11/1971 | Grabowski et al. | 343/16 M |
| 4,160,975 A | * | 7/1979 | Steudel | 343/16 M |
| 4,196,436 A | * | 4/1980 | Westerman | 343/380 |
| 4,277,788 A | * | 7/1981 | Torby | 343/16 M |
| 4,667,201 A | * | 5/1987 | Itoh | 342/371 |

\* cited by examiner

*Primary Examiner*—Thomas H. Tarcza
*Assistant Examiner*—Fred H Mull (57) ABSTRACT

A phased array, phase-amplitude monopulse antenna arrangement for ground, shipboard or airborne radar systems. The phased array antenna is systematically warped and projects partially overlapping, separate beams from upper and lower regions of the array. A single set of phase-shifters is employed with a simplified feed structure to permit development of both azimuthal and elevation angle error signals in signal processing circuitry for target analysis.

5 Claims, 9 Drawing Sheets

WARPED PLANE PHASED ARRAY MONOPULSE RADAR ANTENNA

This is a continuation of application Ser. No. 06/576,849, filed Feb. 3, 1994, now abandoned.

TECHNICAL FIELD

This invention relates to a phased array phase-amplitude monopulse radar antenna arrangement, and more particularly to a phased array phase-amplitude monopulse antenna for ground, airborne or ship-based radar systems which combine electronic beam steering in one axis, e.g. elevation, and monopulse angle error measurement in both elevation and azimuthal axes while using a single set of row phase shifters.

BACKGROUND ART

The use of a phase-amplitude array antenna is particularly suited for use in radar systems which are mechanically scanned about one axis and electrically scanned about a second axis. Because of its high degree of versatility, such a radar can simultaneously provide angular elevation and azimuth target position measurements.

The array antenna includes a plurality of vertically and horizontally arranged radiating elements suitably spaced from one another. The relative amplitude and phase of illumination for each element is controlled to obtain a desired combined radiation pattern from the antenna as a whole. The radiating element may be a dipole, waveguide horn, or any other type of antenna. For a more detailed treatment of array antennas, see T. C. Cheston & J. Frank, Chapter 11, *Radar Handbook* (M. I. Skolnik, Editor; McGraw Hill, 1970).

It is known that phase-amplitude array antenna configurations can uniquely define target position including range, angular elevation and azimuth with respect to a boresight axis. The required information is returned from a target in the pair of signals from two portions of the overall antenna, which for example may be the upper and lower halves of a planar array. These signals constitute a pair of vectors which may be out of phase and of different amplitude, if the target is not on the boresight axis.

It is conventional to label the return vectors A and B, and to consider two reference directions: that of the composite vector A+B and its quadrature, 90 degrees removed therefrom. The vector difference A−B defines two quantities: azimuth and elevation error, respectively. Elevation error is the difference component of A−B in phase with A+B; and azimuth error is the difference component of A−B in quadrature or 90 degrees removed from A+B.

Return vectors A and B are established by separately receiving signals from the selected target from separate regions of the array antenna. The direction of the antenna beam from each section is offset from the boresight axis but the respective beams overlap, permitting a separate return in phase and amplitude from each composite antenna pattern. From these measured phase and amplitude differences, angle and azimuth information can be derived, which can be interpreted to provide an indication of target position.

As will be seen, two sets of phase shifters and a complex antenna and feed structure are required in the construction of a conventional phased array, phase-amplitude monopulse radar system. This is because a typical array antenna employs a flat planar arrangement of radiators which often are end-fed from the feed structure. Normally, the array is rotated in an azimuth about a vertical axis, and elevation scan is electronic.

This physical rotation makes it difficult to effectively derive an azimuthal monopulse. Elevation monopulse is much more conveniently established through an end-fed array and monopulse feed network providing both a sum channel (for weighted summation of signals for all the rows), and an elevation difference signal channel (for weighted summation of difference signals between corresponding upper and lower rows).

Conventionally, the dividing network on each row can be designed to provide an azimuth difference signal as well as the sum signal. Additional phase shifters and a summing network can be provided to establish an azimuth difference signal. However, it is difficult to obtain a useable azimuth difference signal while maintaining effective frequency scan in azimuth associated with the end row feed rows, while concurrently maintaining low sidelobe characteristics.

Accordingly, it is an object of the invention herein to eliminate the need for the complex feed structures required by conventional rotating 2-axis monopulse systems.

It is additionally an object of the invention to eliminate the need for two sets of phase shifters as employed in the current technology.

It is a further object of the invention to establish an array antenna arrangement with very low sidelobes.

It is another object of the invention to obtain the azimuth difference signal while maintaining the low sidelobe and frequency scan characteristics of an end-feed array.

It is even another object of the invention to provide an improved phase-amplitude monopulse configuration in which the array is divided into upper and lower faces, which are warped left and right in azimuth.

DISCLOSURE OF INVENTION

The instant invention establishes a phased array monopulse radar antenna arrangement employing a warped array which aims the upper and lower portions of the antenna array in respectively different horizontal directions, as for example to the right and left respectively.

The warp may for example be a mechanical or electrical twist in the array, which provides the novel aiming feature of the invention.

As a result of the warp, a vertical difference signal is capable of establishment between the top and bottom halves of the antenna. The signal carries horizontal axis amplitude monopulse error data as well as vertical axis phase monopulse error data. The feed remains the same as for elevation-only monopulse, including vertically weighted sum and difference channels. The invention configuration includes the former elevation phase monopulse and an azimuth amplitude monopulse characteristic as well.

BRIEF DESCRIPTION OF DRAWINGS

FIGS. 9A and 9B respectively illustrate the abrupt and gradual squint geometries for the radar array antenna.

BEST MODE FOR CARRYING OUT THE INVENTION

Figure 1:
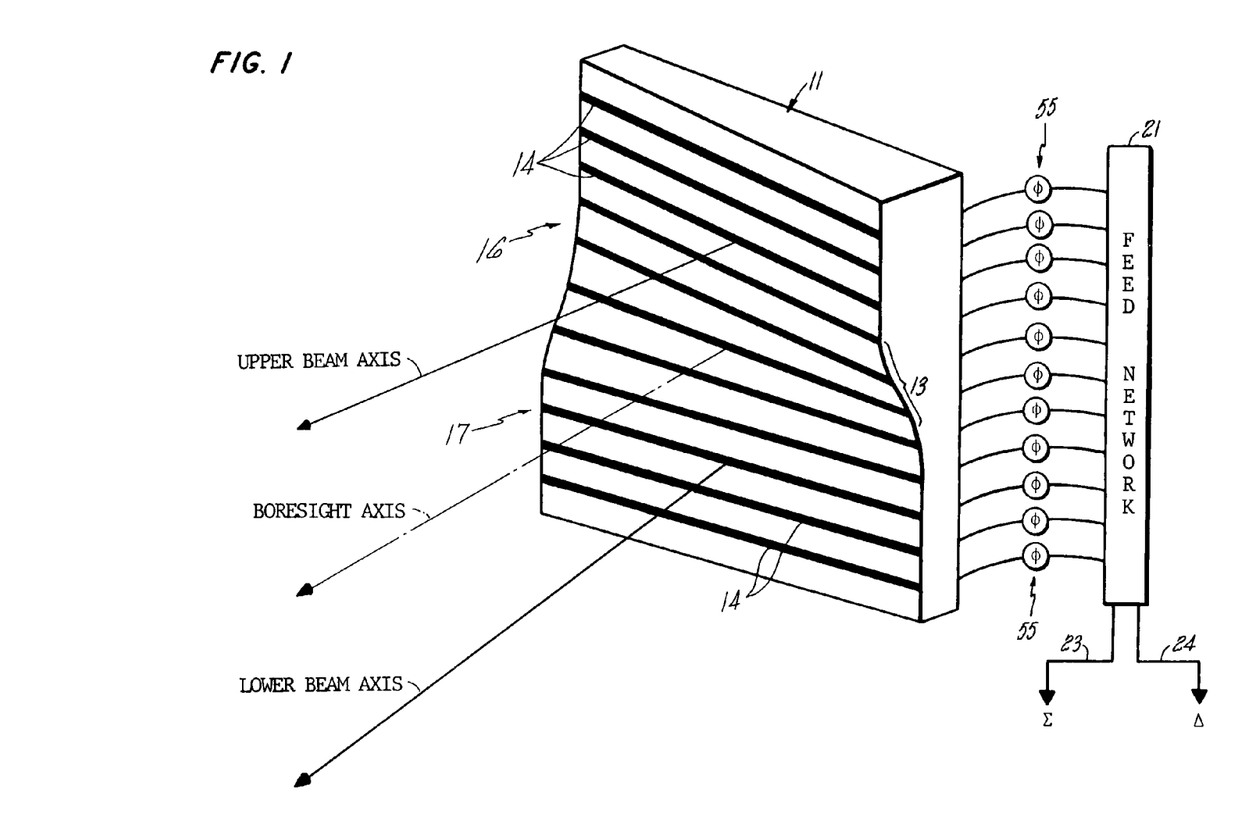
FIG. 1 shows a schematic view of the array antenna and illustrates a portion of the remainder of the radar system including the feed network for providing sum and difference monopulse signals.

FIG. 1 schematically shows a phased array phase-amplitude monopulse radar antenna subject to gradual warp 13, effective for reorienting the azimuthal disposition of radiating rows 14 in the radar array in an incremental fashion. An upper section of radiating rows 16 is rightwardly skewed and a lower section of radiating rows 17 is leftwardly skewed with respect to the boresight axis. The array is thus separated into segregated upper and lower sections for radiating separate skewed beams A and B of electromagnetic energy toward a target region. The beams are initially vertically spaced but spread into a horizontally spaced relationship in the target region, permitting the establishment of phase-amplitude monopulse signals which can be resolved into useful target information.

The return signal from a detected target is received by the upper and lower sections of the antenna array, effectively returning through the same feed network 21, thereby producing sum and difference monopulse signals, respectively 23 and 24.

Figure 2:
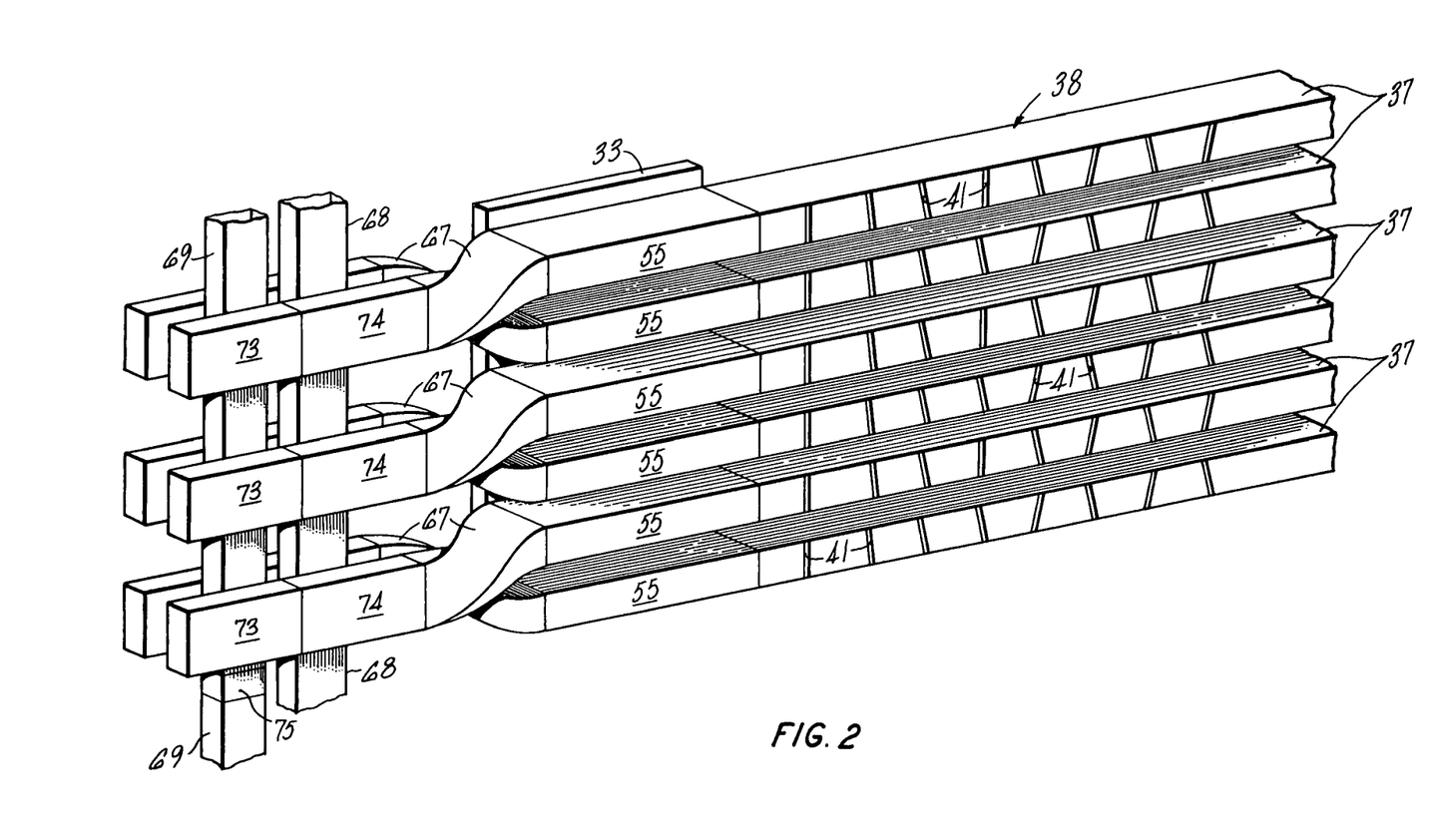
FIG. 2 shows details of a portion of the antenna array including independent slotted rows of structured waveguide and a feed network including phase shifters and twist sections.

FIG. 2 shows a portion of the array including a support structure 33 and the radiating rows 37 of horizontally disposed waveguides 38 defining skewed radiating slots 41. The waveguides are individually end-fed through a phase shifter and driver 55 mounted on the support structure 33. The respective phase shifters 55 provide elevation beam steering. Each phase shifter 55 is suitably coupled with a twist section 67 effective for vertically aligning the waveguides 38 to communicate electromagnetically with a vertical microwave beam forming network including a dual channel lattice feed including sum and difference series feeds, respectively 68 and 69. The difference series feed 69 has upper and lower parts, which are separated by a phase reversal section 75, which provides a phase reversal between the illumination of the upper and lower parts of the antenna.

Directional couplers 74 are effective for coupling sum signals between corresponding radiating rows 37 and the sum series feed 68; similarly, directional couplers 73 are effective for coupling difference signals between corresponding radiating rows 37 and the difference series feed 69. Any coupling between series feeds 68 and 69 is negligible. For additional information regarding directional couplers, see pp. 299–301 in C. G. Montgomery, R. H. Dicke and E. M. Purcell; *Principles of Microwave Circuits*; Boston Technical Publishers, Inc. (Lexington, Mass., 1964).

The purpose of providing phase shifters 55 is to permit electronic steering of the phased array antenna with respect to elevation angle. This is described in detail at chapter 8, M. I. Skolnik, *Introduction to Radar Systems* (2d. Ed., McGraw-Hill, 1980).

According to the invention, the monopulse sum signal is made up of the appropriately weighted sum of the signals of all rows 37. Similarly, the difference signal is the sum of the appropriately weighted differences between all symmetrically corresponding upper and lower rows. The vertical amplitude weighting is applied by suitably selecting the coupling coefficients of the various directional couplers in groups 74 and 75. Variable phase weighting from phase shifters 55 is used to steer the beam in elevation.

Figure 3A:
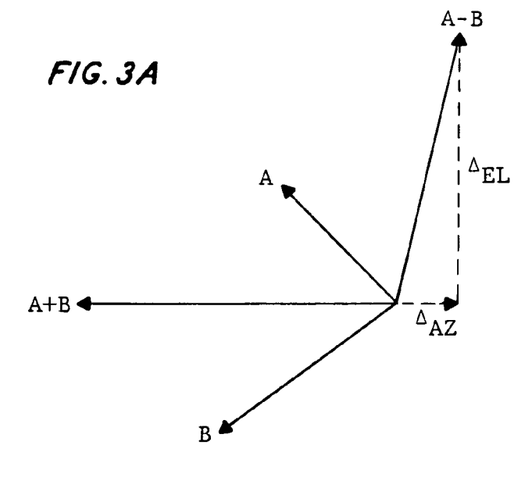
FIGS. 3A and 3B illustrate the principle of phase-amplitude monopulse in terms of vector response signals from an off-boresight target, and shows the antenna illumination and beam projection from the respective upper and lower regions of the antenna.
Figure 3B:
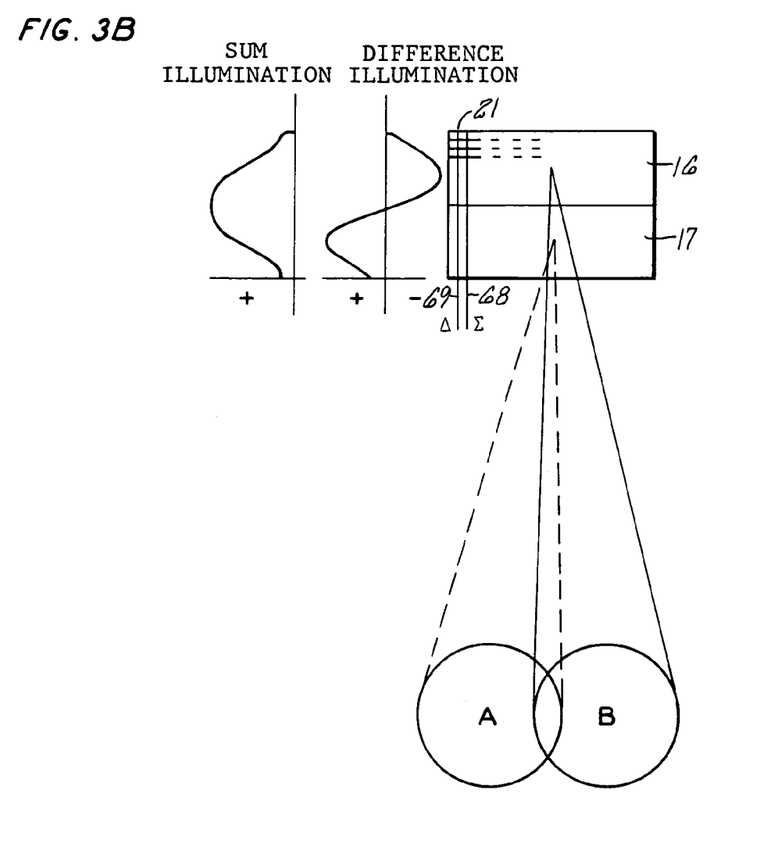

FIGS. 3A and 3B effectively illustrate the principle of phase-amplitude monopulse according to the present invention. In particular, FIG. 3A shows the vector phase and amplitude relationships of the composite return signals A and B from a target off the boresight axis, the sum A+B of the signals, the difference A−B of the signals, and the respective phase-aligned and quadrature components of the difference A−B, which define respectively the azimuth and elevation error. Without an opposite warp for different portions of the antenna, the difference feed 69 would cancel any azimuth error.

The radiated beams A and B shown in FIG. 3B originate from the lower and upper portions of the phased array, respectively 16 and 17. This is the result of vertical sum illumination as shown. The warp in the array surface causes the beams A and B in FIG. 3B to attain a horizontal offset with respect to the boresight axis in the vicinity of potential target objects.

Figure 4A:
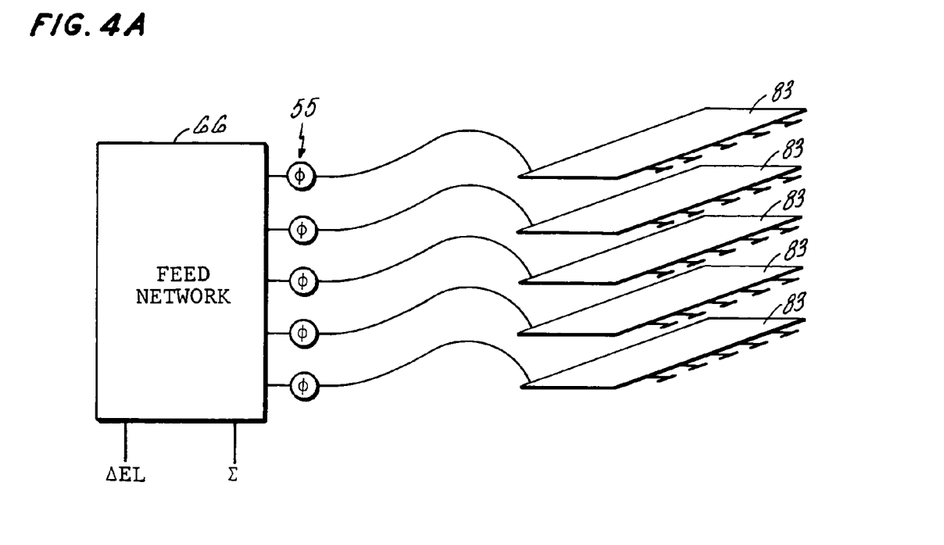
FIGS. 4A and 4B respectively show a conventional elevation monopulse arrangement and a conventional elevation plus azimuth monopulse including feed networks and phase shifters, the latter arrangement being subject to the burden of requiring two sets of phase shifter elements.
Figure 4B:
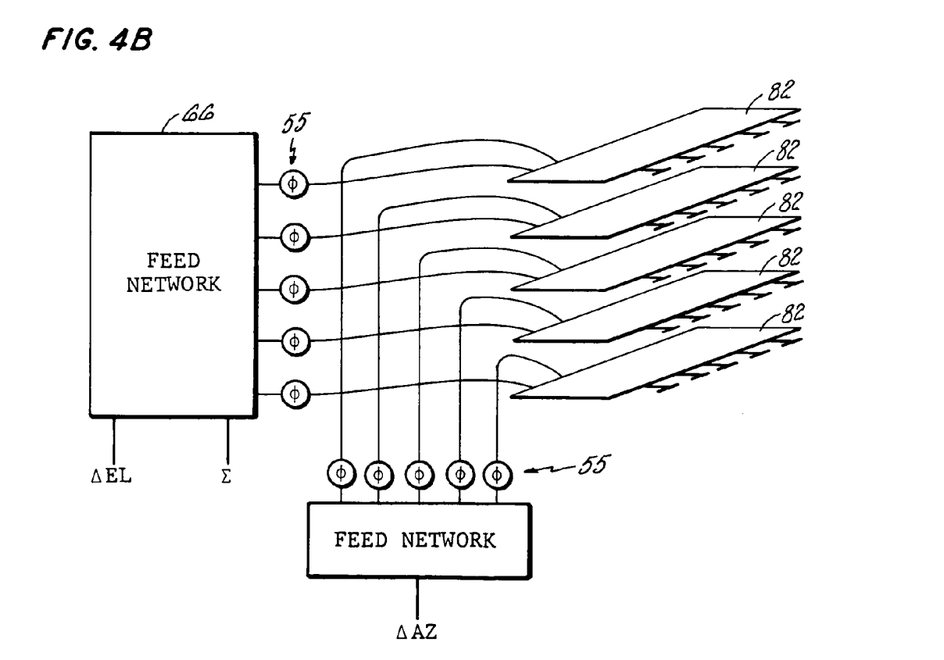

FIGS. 4A and 4B show conventional schemes of obtaining respectively elevation monopulse, and both elevation and azimuth monopulse information. In this case, the azimuth monopulse configuration requires complex rows of dividers 82, rather than simple rows of dividers 83 in an end-fed configuration. In addition, a second set of variable phase shifters is required for elevation steering of the azimuth monopulse difference pattern signals in addition to the first set of phase shifters which steers the sum and the elevation difference pattern signals.

More particularly, although each version of FIGS. 4A and 4B employs row radiators 37 leading to phase-shifters 55 and a feed structure 66, a separate set of phase-shifters 55 and feed network 97 is required for the arrangement of FIG. 4B.

Figure 5:
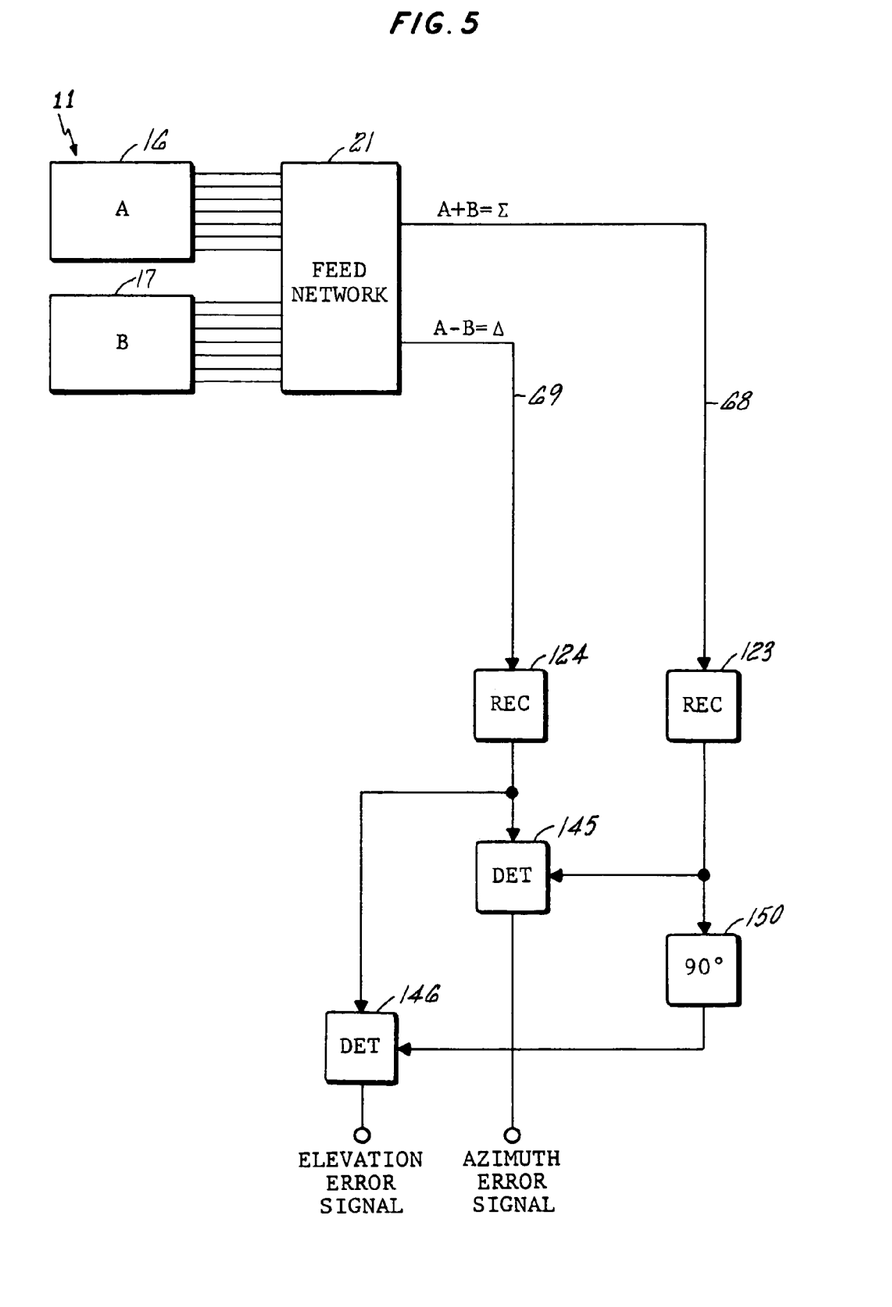
FIG. 5 shows a block diagram of signal processing circuitry effective for resolving sum and difference monopulse signals into desired elevation and azimuth error signals.

FIG. 5 is a block diagram of typical phase-amplitude monopulse signal processing circuitry for deriving useful information regarding target elevation and azimuth from the difference and sum monopulse signals provided by the feed network 21. In particular, FIG. 5 shows the vertical feed network 21 coupled to the upper and lower halves of the warped plane array, A and B, to develop the respective sum and difference monopulse signals on leads 68 and 69 respectively. Respective matched-phase receivers 123 and 124 accept the respective monopulse sum and difference signals from leads 68 and 69.

Receivers 123 and 124 apply a mixing frequency to the input monopulse signal received and amplify the respective signals to a level permitting effective operation of phase-sensitive detectors 145 and 146. Each detector receives both receiver outputs and provides an output signal whose amplitude is proportional to the ratio of the in-phase component of the error signal to the amplitude of the sum channel reference signal. In order to permit the development of an elevation error signal by detector 146, the output of sum receiver 123 is phase shifted ninety degrees by phase shifter 150. The azimuth error signal is developed directly by detector 145 from the information provided by receivers 123 and 124.

Receivers 123 and 124 are subject to closed-loop pilot-pulse phase and amplitude correction circuitry (not shown) to prevent receiver phase shift errors from causing cross-coupling of azimuth and elevation error signal information and to maintain accurate angle error measuremets. The receivers 123, 124 used in this embodiment employ well known circuit components and systems each including for example mixer circuitry (not shown) which has a heterodyning frequency applied thereto by a common local oscillator (also not shown). The output of the mixer is then provided to suitable well-known switching and multistage low-noise IF circuitry effective to provide IF outputs to its corresponding phase detectors 145 or 146.

A suitable phase sensitive detector 145, 146 for example includes an IF cross-coupling circuit, IF summing amplifiers, logarithmic detectors, and video operational amplifiers, not shown in the drawing, Alternatively, 145 and 146 can be a phase detector which includes the following circuit elements not shown in the drawing: an IF cross-coupling network, an IF quadrature hybrid circuit, an envelope detecting and summing means and a linearizing operational amplifier. The IF quadrature hybrid circuit is well known in the art and couples a portion of the power at each output with a ninety degree phase shift and provides an output signal, the amplitude or envelope of which is a function of the relative phase angle of a vector waveform at its input.

For additional detail regarding receivers and phase detector circuitry which is applicable to the invention herein, one skilled in the art may be directed to refer to U.S. Pat. No. 3,766,556, issued to assignee United Aircraft (now United Technologies Corporation) in 1973. The patent is hereby incorporated by reference into the disclosure of this invention.

Figure 6:
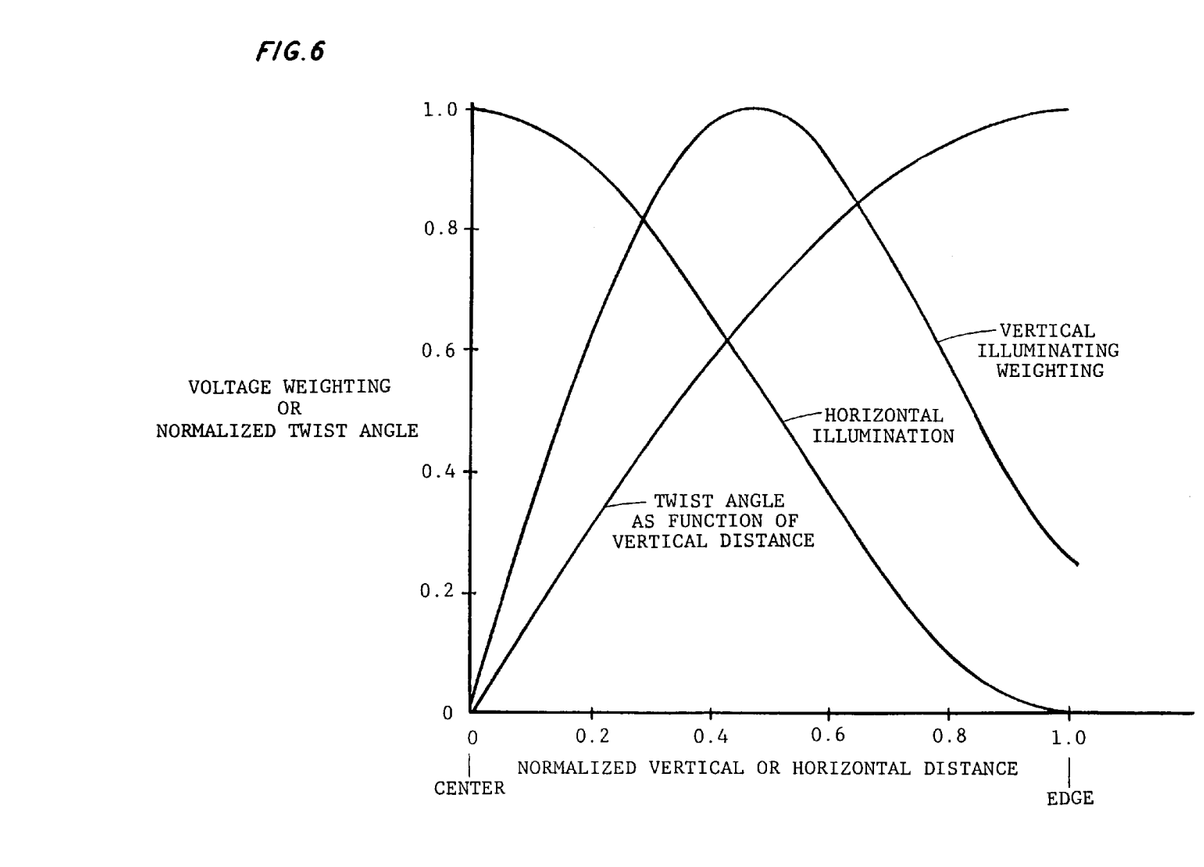
FIG. 6 shows curves of the vertical array illumination, and a preferred warp angle scheme.

In a preferred embodiment of the invention, the respective sum and difference series feeds, 68 and 69, of feed network 21, are subject to the vertical illumination pattern shown in FIG. 3B. The vertical sum illumination is greatest at the center, while the difference pattern is weighted heavily approximately halfway between the antenna end and center. The azimuth sum pattern is similarly weighted most heavily in the center as shown in FIG. 6. This effect, however, is somewhat reduced as a result of warping the upper and lower parts of the antenna right and left. The preferred warp or twist angle is gradual as seen in FIG. 6. This minimizes losses in the sum feed 68 and maximizes azimuth difference signal sensitivity.

Figure 7:
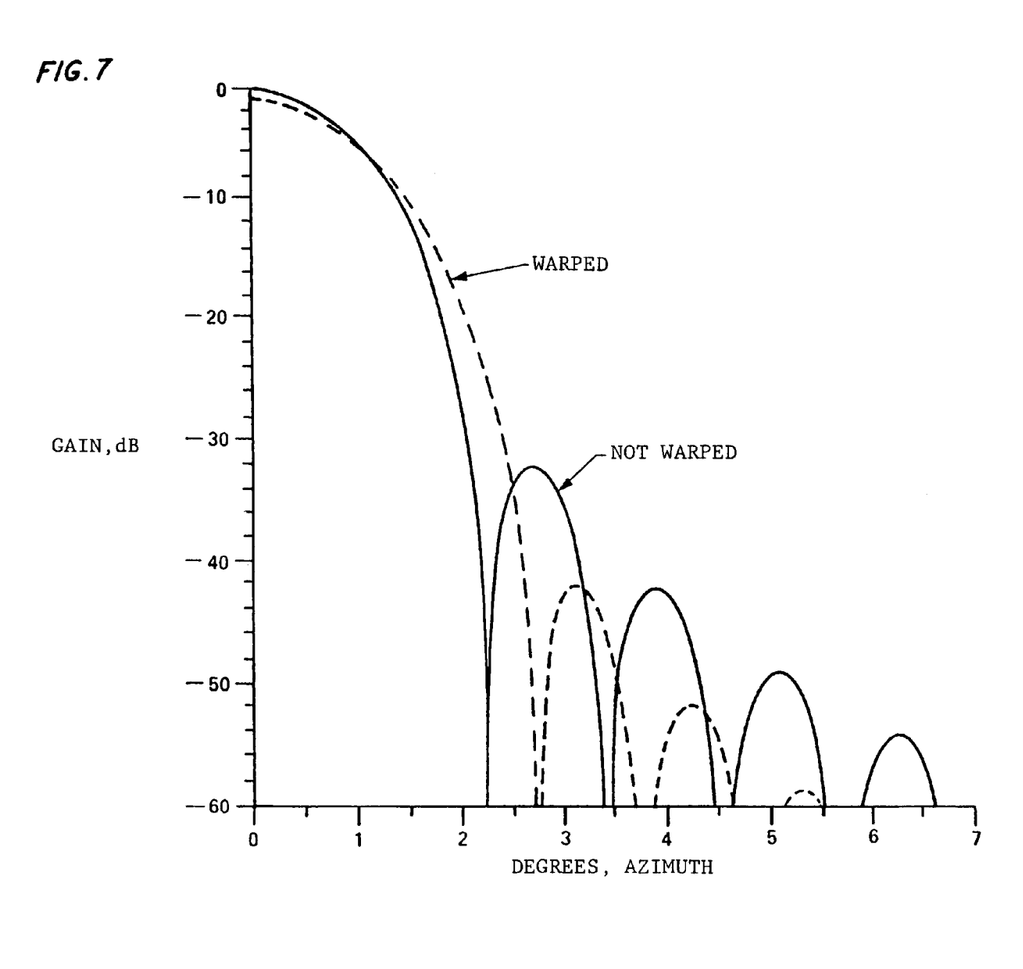
FIG. 7 illustrates the sidelobe reduction feature of this invention.

The effect of warping the antenna produces reduced sidelobe radiation as shown in FIG. 7, thereby enhancing the efficiency of the antenna, since main beam energy is maximized when the sidelobes are reduced.

Figure 8:
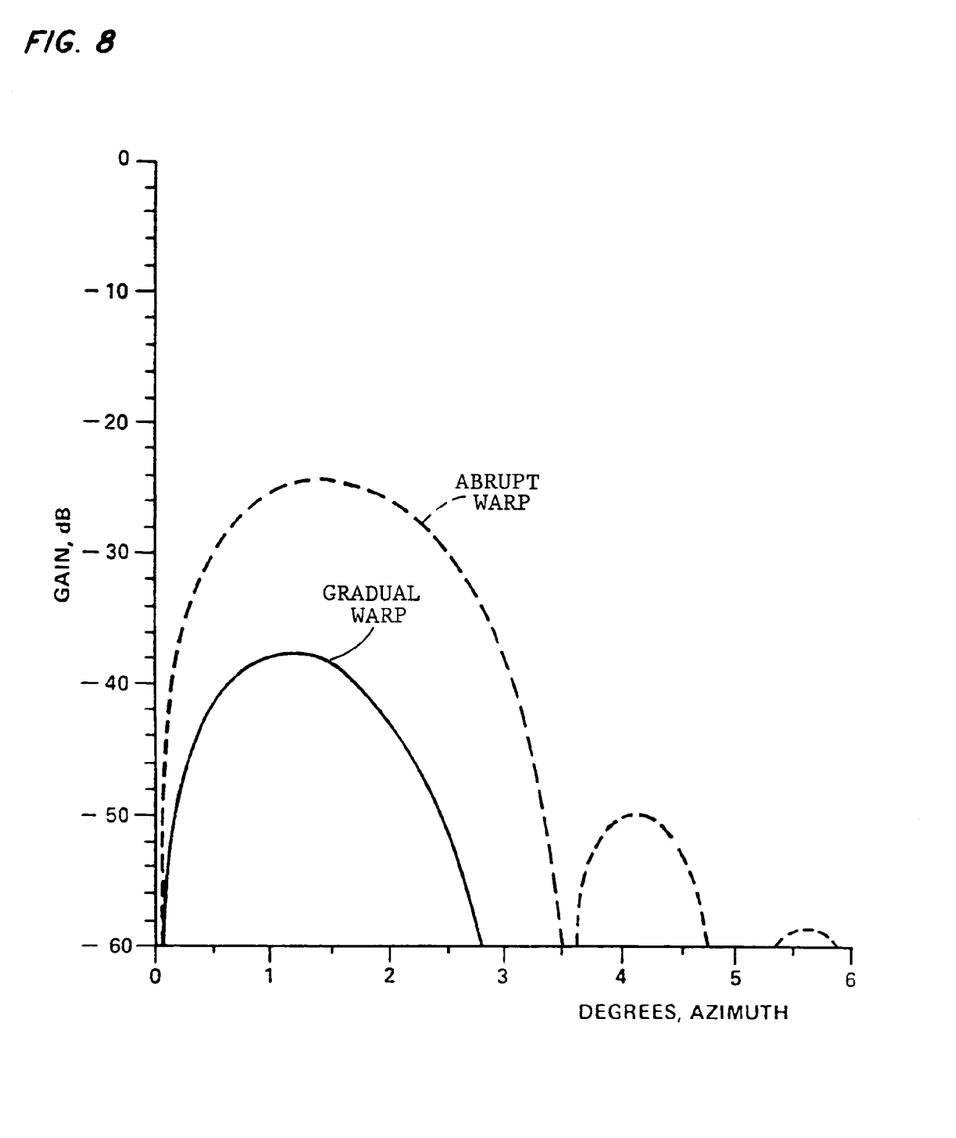
FIG. 8 shows the difference in sidelobe conditions for gradual and abrupt warp configurations.
Figure 9A:
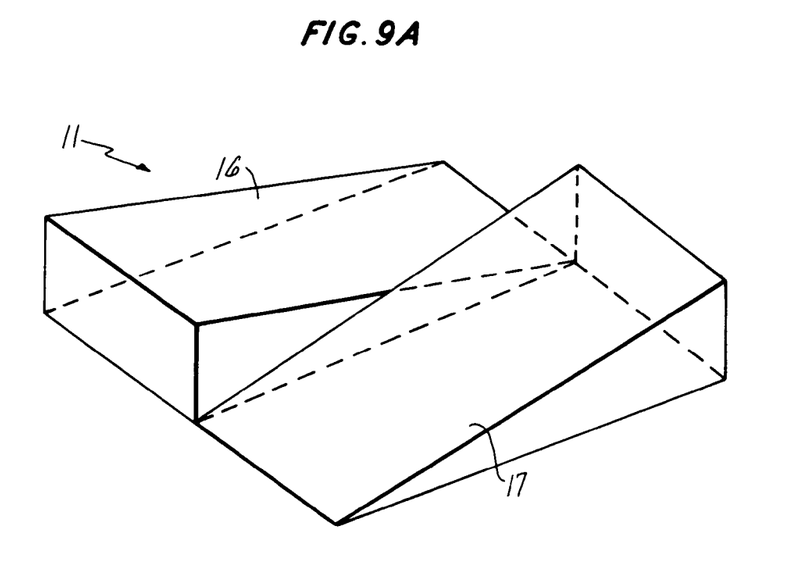
Figure 9B:
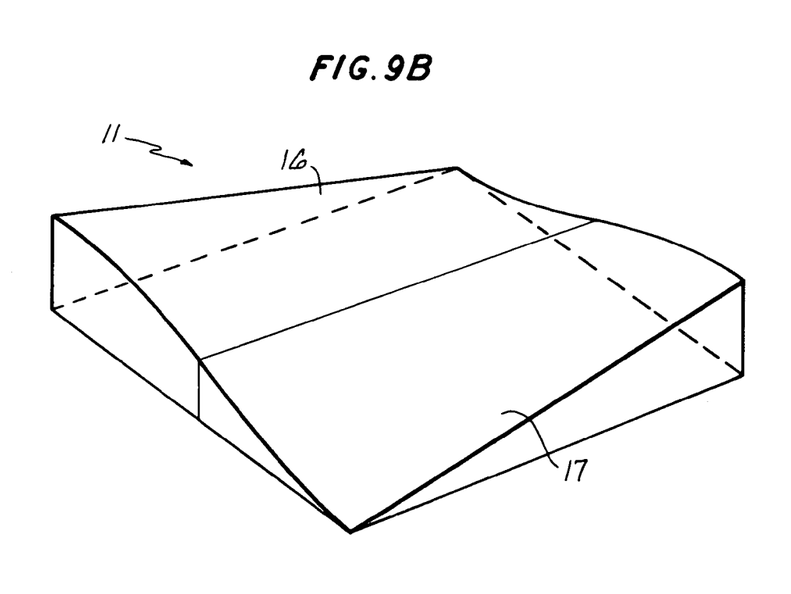

Finally, FIG. 8 shows an important improvement in azimuth difference pattern sidelobe conditions by comparing the gradual and abrupt warp configurations which are graphically set forth in FIGS. 9A and 9B. In particular, the Figure shows substantially reduced sidelobes for the gradual warp version.

It is clear that a variety of warp functions can be employed, including straight-line gradual, sinusoidal or various combinations of pure or tapered sine functions. Simplicity of construction makes it useful to arrange the row radiating elements (e.g., suitably slotted waveguides) in the fashion of individual horizontal pieces similar to those of a Venetian blind, which can be twisted without deforming any of the pieces. The azimuthal disposition of each row thus varies incrementally from that of its neighbors. This can be accomplished electrically as well as mechanically.

The consequence of warping the array with a deflection (twist) of the horizontal rows can be an enhanced amplitude taper across the array, e.g. by a factor of the cosine of the integrated phase change introduced at the edges of the array by the twist, thereby reducing the azimuth sum pattern sidelobes as shown in FIG. 8.

Without doubt, the above material may suggest other variations of the invention beyond those explicitly set forth. This is to be expected. However, the scope of the invention may include those variations, since the invention herein is bounded not by the embodiment set forth, but only by the terms and limitations of the claims below.

What is claimed is:

1. In a phased array, phase-amplitude monopulse radar system, a radar subsystem comprising:

a phased array antenna including a plurality of substantially horizontal rows of radiating elements disposed in phased-relationship to one another;

said plurality of substantially horizontal rows of radiating elements being maintained in a predetermined relationship along a vertical axis with a top and bottom horizontal row, each of said horizontal rows having a horizontal perpendicular sensitivity direction in a horizontal plane making a horizontal acute angle with respect to a boresight line;

feed means for coupling radiation to and from said phased array antenna, said feed means including sum and difference feed means for coupling respective sum and difference monopulse information from said phased array antenna to a signal processing means for interpreting radar return signals; and a plurality of phase shift means connected directly to said rows of radiating elements for controllably modifying the phase of electromagnetic energy coupled from said feed means to each of said horizontal rows of said phased array antenna;

characterized in that:

each of said top and bottom rows of said phased array antenna is set with a corresponding horizontal sensitivity direction on opposite sides of said boresight line and forming a diverging acute angle with respect thereto;

at least two intermediate rows of said plurality of horizontal rows are set with monotonically varying intermediate angles of said horizontal sensitivity directions, whereby said difference monopulse information contains both elevation and azimuthal difference information.

2. A radar system according to claim 1, further characterized in that said plurality of substantially horizontal rows of radiating elements are disposed in a non-planar vertical array, each horizontal row making an acute horizontal row angle in a horizontal plane with respect to said boresight direction and being substantially perpendicular to said horizontal sensitivity direction, whereby said sensitivity directions correspond to mechanical angular differences in the dispositon of said horizontal rows.

3. A radar system according to claim 1, further characterized in that said plurality of substantially horizontal rows of radiating elements are disposed in a substantially planar array and further characterized in that said feed means feeds each of said horizontal rows with radiation in a predetermined horizontal phase gradient corresponding to a desired horizontal sensitivity direction.

4. A radar system according to claim 2, further characterized in that said phase shift means comprises a set of a single phase shift element for each of said plurality of horizontal rows.

5. A radar system according to claim 3, further characterized in that said phase shift means comprises a set of a single phase shift element for each of said plurality of horizontal rows.

* * * * *